Nov. 27, 1962     A. T. FLOWER     3,066,181
SPREADER BARS FOR CONDUCTOR WIRES
Filed Nov. 23, 1960
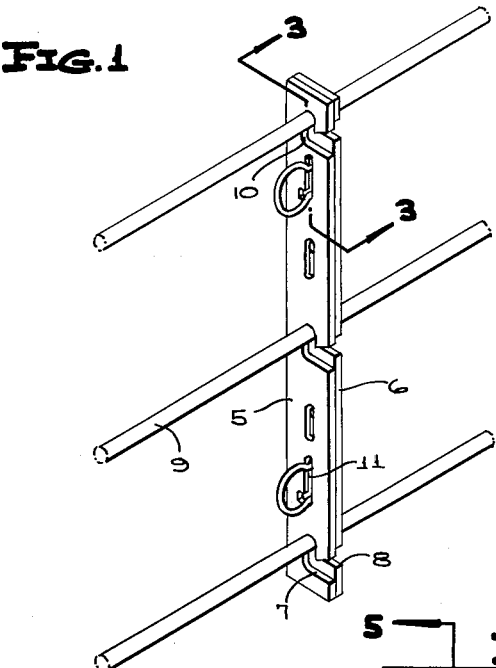
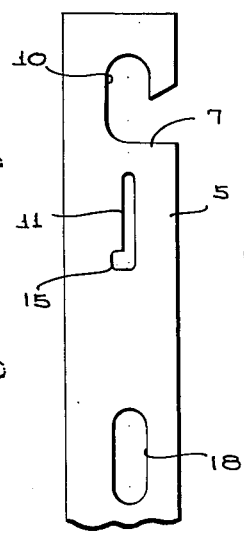
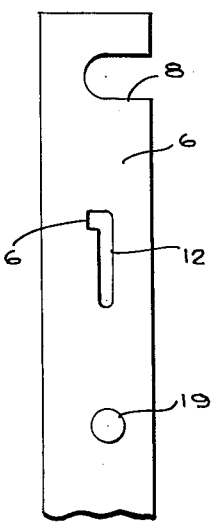
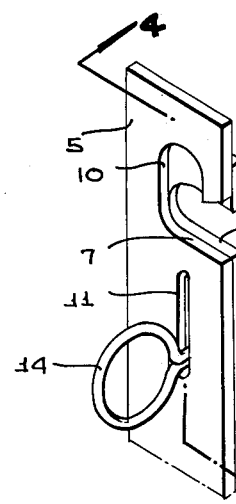
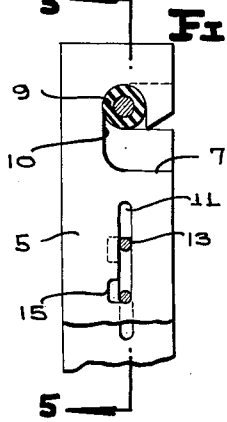
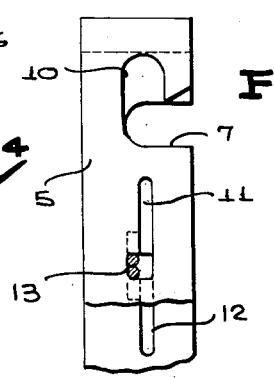
INVENTOR.
ARCHIBALD T. FLOWER
BY *Ralph B Burch*
ATTORNEY

United States Patent Office 3,066,181
Patented Nov. 27, 1962

3,066,181
SPREADER BARS FOR CONDUCTOR WIRES
Archibald Thomas Flower, Glenside, Pa. (Queen St. and Ivy Hill Road, Philadelphia 18, Pa.)
Filed Nov. 23, 1960, Ser. No. 71,323
1 Claim. (Cl. 174—146)

This invention relates to spreader bars for electric conductor wires.

It is an object of the invention to provide a spreader composed of a pair of superimposed bars having cooperating slots in their longitudinal edges to receive conductor wires, the bars being slidably connected together and movable to retain the spreader in engagement with the wires.

A further object of the invention resides in providing a pair of slidably connected spreader bars, each of the bars being provided with spaced slots opening through an edge of the bars to receive conductor wires, with the slots of one bar having a branch for locking engagement with the conductor wires upon sliding movement of one bar with respect to the other bar.

A still further object of the invention resides in providing a pair of bars slidably connected together for longitudinal movement, each of the bars having spaced slots opening through an edge of the bars to receive conductor wires, the slots of one bar having branches to receive the conductor wires upon sliding movement of the bar with respect to the other bar and spring means normally moving said bars to engage the branches of the slots with the conductor wires.

Other objects and advantages of the invention will be apparent during the course of the following specification.

In the accompanying drawing forming a part of this specification and in which like numerals are employed to designate like parts throughout the same, FIG. 1 is a perspective view of the spreader applied to a series of conductor wires, FIG. 2 is a fragmentary perspective view of one end of the spreader showing the bars in position to receive the wires, FIG. 3 is a section taken on line 3—3 of FIG. 1, FIG. 4 is a section taken on line 4—4 of FIG. 2, FIG. 5 is a section taken on line 5—5 of FIG. 3, and FIGS. 6 and 7 are fragmentary side views of the bars forming the spreader.

In the drawing, wherein for the purpose of illustration a preferred embodiment of the invention is shown, the numerals 5 and 6 denote a pair of elongated flat bars constructed of suitable insulation material such as reinforced polyester glass fibre. The bars are disposed in superimposed parallel relation and along one longitudinal edge of each bar are a series of spaced lateral slots 7 and 8 adapted to receive the conductor wires 9. The slots 7 of bar 5 are L-shape with a branch 10 extending longitudinally of the bar. The bars 5 and 6 are provided with central longitudinal slots 11 and 12 adapted to receive the legs 13 of a spring ring 14 which normally expands the legs against opposite ends of the slots 11 and 12 and thereby moves the bar 5 longitudinally of the bar 6, so that the wires 9 in slots 7 and 8 are disposed in the branch 10 of slots 7 and thereby held against accidental displacement. The slots 11 and 12 at opposite ends are provided with lateral notches 15 and 16 to receive the legs of the spring rings 14 when the rings are compressed and thereby hold the rings compressed when the bars 5 and 6 are moved to bring the slots 7 and 8 into alinement. The free ends of the legs 13 of the spring rings are bent, as at 17, to engage the face of the bar 6 to retain the rings in the slots 11 and 12. The bars are provided with slots 18 and openings 19 respectively, for attaching a bridle to the spreader when required.

In use, when the spreader is applied to the conductor wires 9, the bars 5 and 6 are moved longitudinally in opposite directions to compress the spring rings 14 and bring the slots 7 and 8 into register to receive the conductor wires. When the spring rings are compressed the legs 13 are moved into the notches 15 of the slots 11 and 12 to hold the rings compressed and the slots 7 and 8 of the bars in register while inserting the wires. After inserting the wires in the slots 7 and 8, the legs of the spring rings are released from the notches 15 and upon expansion of the rings the bar 5 is moved longitudinally of the bar 6 so that the slots 7 and 8 do not register and the branch 10 of slots 7 engage the wires thereby locking the wires against removal.

It is to be understood that the form of my invention herein shown and described is a preferred example of the same and changes in the shape, size and arrangement of the parts may be made without departing from the spirit of the invention.

Having thus described my invention, I claim:

A spreader bar for conductor wires comprising a pair of elongated flat bars disposed in superimposed parallel relation, each bar having a series of spaced lateral slots extending in the same direction and opening through an edge of the bar with the slots of one bar co-acting with the slots of the other bar for receiving the conductor wires and having branches extending at an angle thereto for receiving the conductor wires when said bars are moved longitudinally in opposite directions, and an expandable spring ring having legs disposed in longitudinal slots formed in said bars to move said bars in opposite directions and the slots in said bars to non-registering position, the longitudinal slots of said bars having notches adjacent opposite ends adapted to register to receive the legs of said ring when said bars are moved to bring the lateral slots of said bars in register whereby said ring is held compressed and said bars are held against longitudinal movement.

References Cited in the file of this patent

UNITED STATES PATENTS

| | | |
|---|---|---|
| 2,457,435 | Beckman | Dec. 28, 1948 |
| 2,710,382 | Fitzpatrick et al. | June 7, 1955 |
| 2,791,335 | Leebow | May 7, 1957 |
| 2,783,296 | Hendrix | Feb. 26, 1957 |
| 2,928,636 | Flower | Mar. 15, 1960 |

FOREIGN PATENTS

| | | |
|---|---|---|
| 775,828 | Great Britain | May 29, 1957 |